United States Patent Office 2,776,217
Patented Jan. 1, 1957

2,776,217
OPTICAL GLASS

Otto Gott, Delligsen/Grunenplan uber Alfeld (Leine), Germany, assignor to Deutsche Spiegelglas Aktiengesellschaft, Grunenplan uber Alfeld-Leine, Germany No Drawing. Application August 21, 1953,
Serial No. 375,810

Claims priority, application Germany August 23, 1952

2 Claims. (Cl. 106—52)

This invention concerns improvements in or relating to optical glass and especially that for spectacle lenses.

Since it is known that ferrous iron provides glass with the property of absorbing infra-red radiation, there has been no lack of fusion methods aimed at changing the green or blue tint of clear ferro-silicate optical glasses by the selection of suitable compositions so as to produce a neutral grey or slightly brown tint. None of these attempts has, however, yet produced a glass which has, allied with substantially the same transparency as that of a slightly green-tinted iron glass, a suitable infra-red absorption quality. It is therefore desirable to find a glass composition which provides a neutral coloured or slightly brown optical glass, e. g. for spectacle lenses, and also has a light transmission of 70 to 85% and an adequate absorption in the heat radiation range.

Chemical and glass circles have long been aware that an addition of titanium dioxide ($TiO_2$) or tungstic oxide ($WO_3$) to silicate glasses with a ferrous content produces a shifting of the greatest light transmission in the visible spectrum from green towards yellow. However, this oxidic combination produces an inadequate colour shift from blue-green to yellow-brown in the case of clear glasses. If increased additions are made of titanium oxide or tungstic oxide, the transmission of light drops so rapidly that the glasses are no longer suitable as spectacle glasses.

It has now been possible, as a result of a large number of fusion experiments and measurements, to obtain a glass with the desired proportions. In accordance with the invention this is achieved by the addition to the usual components of the clear glass of ferrous oxide (FeO), titanium dioxide ($TiO_2$) or tungstic oxide ($WO_3$), and very small amounts of ferric oxide ($Fe_2O_3$) and selenium, the required quantities being variable within the following limits by weight:

| | Percent |
|---|---|
| FeO | 0.11 to 0.20 |
| $Fe_2O_3$ | 0.01 to 0.02 |
| $TiO_2$ (or $WO_3$) | 0.11 to 0.40 |
| Se | 0.001 to 0.03 |

The following is an example of the composition of a glass in accordance with the invention, showing the particular constituents in precise proportions by weight:

| | Percent |
|---|---|
| $SiO_2$ | 72.26 |
| $Na_2O$ | 12.75 |
| CaO | 11.00 |
| $K_2O$ | 3.75 |
| FeO | 0.11 |
| $Fe_2O_3$ | 0.01 |
| $TiO_2$ | 0.12 |
| Se | 0.002 |

The same optical qualities are obtained if the titanium oxide is replaced by tungstic oxide.

In such silicate glasses the combination of oxides produces a colour complex in which the absorption of infrared radiation by the ferrous iron remains effective from neutral grey to slightly brown tints and at the same time there is only a very minor amount of absorption in the visible range.

The most advantageous way of presenting the heat absorption qualities of glasses according to this invention is to indicate the relation of the extinction value in the heat radiation range to that in the visible range. If the extinction value is designated E and the transparency as D, as is known $E = \log 1/D$ as described in "The Properties of Glass" by G. W. Morey, page 367, first edition. In view of the logarithmic relationship between the transparency and the thickness of the glass, the suggested identification of the relative values of the extinction renders additional data as to the glass thickness redundant. It is also significant to indicate this extinction ratio in connection with two characteristic wave lengths for the heat radiation range and the visible range. For this purpose the wave lengths 11,000 A. U. and 5,500 A. U. will be chosen. At 11,000 A. U. there is a relatively high transmission through the transparent media of the eye; moreover the maximum radiation from an incandescent lamp lies at approximately this wave length. It is to be expected, therefore, that this wave length will give the maximum thermal effect in the interior of the eyes, viz. at the locations which mainly absorb the radiation, i. e. the iris and the chroid membrane. The maximum brightness sensitivity of the eye adapted to brightness is at 5,500 A. U. Glasses in accordance with the invention have a ratio of the extinction values at these two wave lengths which is more than 1.5, neglecting reflection losses.

In order to give a clear indication of the special colouring of glasses according to this invention, use will be made of the trichromatic IBK-system (normal luminous intensity E). According to DIN 5033 "Colour Measurement," the tint is clearly determined according to the Helmholtz table by specifying the "equivalent tint wave length" and the colour saturation as "the spectral colour fraction" for normal degree of light intensity E. Glasses in accordance with the present invention have their colour areas in a range which is bounded by the equivalent tint wave lengths 5740 and 8510 A. U., and have spectral colour fracton.

$\sigma = 0.2$, the bounding points being characterised by the trichromatic factors:

| $x$ | $y$ | $z$ |
|---|---|---|
| 0.3333 | 0.3333 | 0.3333 |
| 0.3610 | 0.3721 | 0.2669 |
| 0.3704 | 0.3627 | 0.2669 |

I claim:
1. An ophthalmic glass consisting essentially of $SiO_2$, $Na_2O$, CaO and $K_2O$ in addition to the following components in the proportions by weight specified ferrous oxide (FeO) 0.11 to 0.20%, ferric oxide ($Fe_2O_3$) 0.01 to 0.02%, selenium (Se) 0.001 to 0.03% and 0.11 to 0.40% of an oxide selected from the group of oxides consisting of titanium dioxide ($TiO_2$) and tungstic oxide ($WO_3$).

2. An optical glass having the following composition by weight:

| | Percent |
|---|---|
| $SiO_2$ | 72.26 |
| $Na_2O$ | 12.75 |
| CaO | 11.00 |
| $K_2O$ | 3.75 |
| FeO | 0.11 |
| $Fe_2O_3$ | 0.01 |
| $TiO_2$ | 0.12 |
| Se | 0.002 |

References Cited in the file of this patent
UNITED STATES PATENTS 1,830,902  Hood _____ Nov. 10, 1931